(12) United States Patent
Gehrke (10) Patent No.: US 10,013,616 B2
(45) Date of Patent: Jul. 3, 2018

(54) DETECTION, IDENTIFICATION, AND MITIGATION OF LENS CONTAMINATION FOR VEHICLE MOUNTED CAMERA SYSTEMS

(71) Applicant: Robert Bosch GmbH, Stuttgart (DE)

(72) Inventor: Mark Gehrke, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/311,237

(22) PCT Filed: May 27, 2015

(86) PCT No.: PCT/US2015/032578
§ 371 (c)(1),
(2) Date: Nov. 15, 2016

(87) PCT Pub. No.: WO2015/183889
PCT Pub. Date: Dec. 3, 2015

(65) Prior Publication Data
US 2017/0109590 A1 Apr. 20, 2017

Related U.S. Application Data

(60) Provisional application No. 62/003,303, filed on May 27, 2014.

(51) Int. Cl.
*G06K 9/00* (2006.01)
*H04N 7/18* (2006.01)
(Continued)

(52) U.S. Cl.
CPC ............ *G06K 9/00791* (2013.01); *B60R 1/00* (2013.01); *G06K 9/6201* (2013.01);
(Continued)

(58) Field of Classification Search
CPC ............ G06K 9/00791; G06K 9/6201; G06K 9/6267; G06T 7/11; G06T 5/00;
(Continued)

(56) References Cited

U.S. PATENT DOCUMENTS 7,016,045 B2 * 3/2006 Kwon .................. G01N 21/538
356/437
7,030,928 B2 * 4/2006 Inagaki ................ H04N 1/2125
348/333.04

(Continued)

FOREIGN PATENT DOCUMENTS

DE 10322087 A1 2/2014
EP 1826648 A2 8/2007
(Continued)

OTHER PUBLICATIONS

International Search Report and Written Opinion for Application No. PCT/US2015/032578 dated Aug. 21, 2015 (13 pages).

*Primary Examiner* — Manav Seth
(74) *Attorney, Agent, or Firm* — Michael Best & Friedrich LLP (57) ABSTRACT

Systems and methods are presented for operating a vehicle camera system to detect, identify, and mitigate camera lens contamination. An image is received from a camera mounted on the vehicle and one or more metrics is calculated based on the received image. The system determines whether a lens of the camera is contaminated based on the one or more calculated metrics and, if so, determines a type of contamination. A specific mitigation routine is selected form a plurality of mitigation routines based on the determined type of contamination and is applied to the received image to create an enhanced image. The enhanced image is analyzed to determine whether the contamination is acceptably mitigated after application of the selected mitigation (Continued)

routine and a fault condition signal is output when the contamination is not acceptably mitigated.

16 Claims, 5 Drawing Sheets

(51) Int. Cl.
    | | |
    |---|---|
    | *G06T 7/00* | (2017.01) |
    | *G06T 5/00* | (2006.01) |
    | *G06K 9/62* | (2006.01) |
    | *G06T 7/11* | (2017.01) |
    | *G06T 11/60* | (2006.01) |
    | *H04N 17/00* | (2006.01) |
    | *B60R 1/00* | (2006.01) |

(52) U.S. Cl.
    CPC .............. *G06K 9/6267* (2013.01); *G06T 5/00* (2013.01); *G06T 7/0002* (2013.01); *G06T 7/11* (2017.01); *G06T 11/60* (2013.01); *H04N 7/183* (2013.01); *H04N 17/002* (2013.01); *B60R 2300/804* (2013.01); *B60R 2300/806* (2013.01)

(58) Field of Classification Search
    CPC ......... G06T 7/0002; G06T 11/60; B60R 1/00; B60R 2300/804; B60R 2300/806; H04N 7/183; H04N 17/002
    See application file for complete search history.

(56) References Cited

U.S. PATENT DOCUMENTS

| | | | |
|---|---|---|---|
| 7,423,752 B2 * | 9/2008 | Leleve ................. | B60Q 1/1423 250/559.4 |
| 7,505,604 B2 * | 3/2009 | Zakrzewski ....... | B64D 45/0015 382/100 |
| 7,672,510 B2 * | 3/2010 | Nagaoka ............... | B60R 21/013 382/104 |
| 7,729,510 B2 * | 6/2010 | Zakrzewski ....... | B64D 45/0015 340/630 |
| 7,983,447 B2 * | 7/2011 | Higuchi ............... | G05D 1/0246 348/345 |
| 8,009,208 B2 | 8/2011 | Steinberg et al. | |
| 8,135,176 B2 * | 3/2012 | Wuerz-Wessel ...... | B60W 40/10 382/107 |
| 8,369,650 B2 | 2/2013 | Zamfir et al. | |
| 8,400,502 B2 * | 3/2013 | Zakrzewski ....... | B64D 45/0015 348/122 |
| 9,043,129 B2 * | 5/2015 | Bonefas ............... | G05D 1/0223 701/300 |
| 9,219,890 B1 * | 12/2015 | Manzur ............... | G01N 21/8851 |
| 9,288,381 B2 * | 3/2016 | Irie ....................... | H04N 5/2171 |
| 9,681,062 B2 * | 6/2017 | Kussel .................. | H04N 5/243 |
| 2008/0100428 A1 * | 5/2008 | Price .................. | B60K 31/0008 340/435 |
| 2009/0174773 A1 | 7/2009 | Gowdy et al. | |
| 2010/0302398 A1 | 12/2010 | An | |
| 2012/0303331 A1 | 11/2012 | Niemczak et al. | |
| 2013/0235201 A1 | 9/2013 | Kiyohara et al. | |
| 2013/0300869 A1 | 11/2013 | Lu et al. | |
| 2014/0010408 A1 | 1/2014 | Irie et al. | |
| 2017/0332072 A1 * | 11/2017 | Abramov ............... | G06K 9/036 |

FOREIGN PATENT DOCUMENTS

| | | |
|---|---|---|
| WO | 20100038223 A1 | 4/2010 |
| WO | 20130092247 A1 | 6/2013 |
| WO | 2014007175 A1 | 1/2014 |

* cited by examiner

DETECTION, IDENTIFICATION, AND MITIGATION OF LENS CONTAMINATION FOR VEHICLE MOUNTED CAMERA SYSTEMS

RELATED APPLICATIONS

This application claims the benefit of U.S. Provisional Application No. 62/003,303, filed May 27, 2014 and entitled "SYSTEM AND METHOD FOR DETECTION AND MITIGATION OF LENS CONTAMINATION FOR VEHICLE MOUNTED CAMERAS," the entire contents of which are incorporated herein by reference.

BACKGROUND

Cameras are increasingly being used in vehicle applications to improve the driver's situational awareness and to support various safety related functions of the vehicle (e.g., lane departure warnings). Further, the cameras used in vehicle applications often require digital processing of captured imagery. Cameras mounted to the exterior of the vehicle are susceptible to accumulating dust, dirt, road salt residue, insects, and other contaminants on the camera lens.

The present invention relates to the systems and methods for addressing contamination of camera lenses, particularly with regarding to contamination of camera lenses in vehicle-mounted camera systems.

SUMMARY

Camera lenses can become contaminated (e.g., obstructed or dirtied) by various foreign objects, materials, or conditions including, for example, fingerprints, scratches, condensation, ice, or frost. Because such contaminants obstruct the field of view of a camera system, the image quality suffers. In some cases, contaminants are not necessarily imaged by the camera because of their location on the lens. For example, contaminating particles may build up inside the focal point of the lens, such that the contaminant is not in focus at the detector array. However, such contaminants still negatively affect (i.e., degrade) image quality by scattering light. Light scattering can create image regions of reduced contrast and/or resolution, as well as distortion.

When the lens is contaminated, true image content may still be available in the captured image data, but can be blurred or otherwise degraded. Further, since the contaminant itself is not clearly imaged by the camera system (e.g., on the detector array), determining which regions of the image are degraded, and to what extent, can become a challenge. Additionally, in some situations, contamination can become so severe that the image is no longer useful for visual or automated use and the camera should therefore be considered non-functional.

In various embodiments, the invention provides a camera lens contamination detection and mitigation system for use in a vehicle. The system detects camera lens contamination, and mitigates the reduced image quality arising from the lens contamination using software. In some embodiments, the system also estimates the type of contamination likely. Further, if the system determines that the lens contamination is too severe to be able to restore the image quality (i.e., that the camera is "blind"), the system issues one or more warnings to the driver.

In one embodiment, the invention provides a method for operating a vehicle camera system. An image is received from a camera mounted on the vehicle and one or more metrics is calculated based on the received image. The system determines whether a lens of the camera is contaminated based on the one or more calculated metrics and, if so, determines a type of contamination. A specific mitigation routine is selected form a plurality of mitigation routines based on the determined type of contamination and is applied to the received image to create an enhanced image. The enhanced image is analyzed to determine whether the contamination is acceptably mitigated after application of the selected mitigation routine and a fault condition signal is output when the contamination is not acceptably mitigated.

In some embodiments, the fault condition signal causes the system to display a message on a display in the interior of the vehicle informing the operator that the captured camera image is distorted. In some embodiments, the fault condition signal partially or entirely disables one or more vehicle assistance systems (e.g., an automated parking system or a lane detection system) when the fault condition signal indicates that the image is unacceptably distorted due to lens contamination.

Other aspects of the invention will become apparent by consideration of the detailed description and accompanying drawings.

BRIEF DESCRIPTION OF THE DRAWINGS

FIG. 3A is an enhanced version of the image of FIG. 3A after mitigation of the image distortion caused by the lens contamination.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
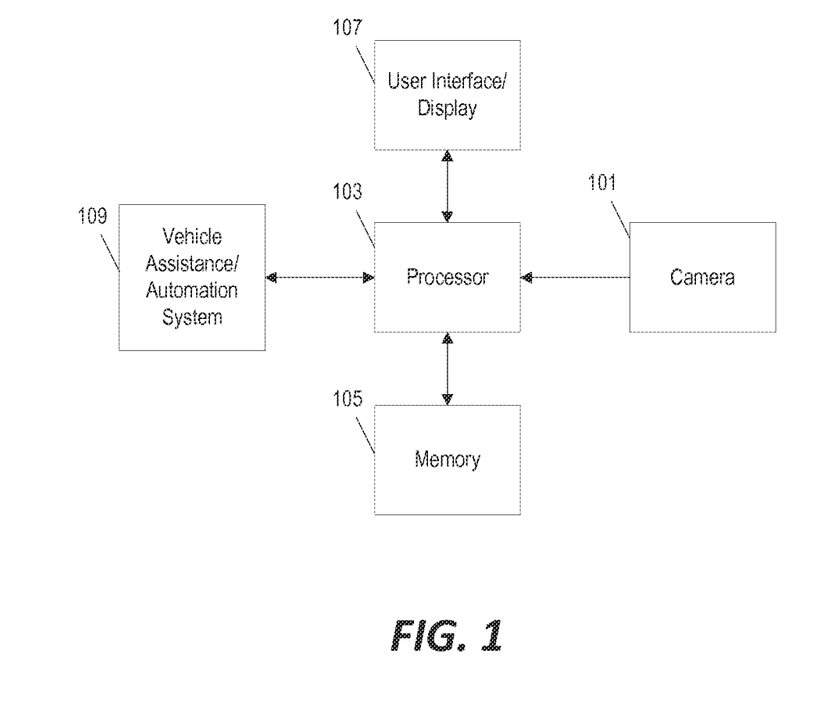
FIG. 1 is a block diagram of a vehicle system including a camera.

FIG. 1 illustrates an example of a vehicle automation and communication system. A camera 101 is mounted on the vehicle with a field of view including, for example, an area behind the vehicle. Such camera systems may be used to assist the driver while operating the vehicle in reverse and specifically while parking. However, in other implementations the camera 101 may be mounted on other locations on the vehicle. Similarly, some implementations may include more than one camera positioned on the vehicle.

The camera 101 captures images and sends the image data to a processor 103. The processor 103 executes instructions stored on a non-transitory computer readable memory 105 (e.g., a Flash memory, a hard disk, or other type of ROM or RAM memory unit) to provide various functionality including, for example, the methods described below. The processor 103 may also store image data on the memory 105. The processor 103 may output the image data from the camera 101 to a user interface/display 107 for display to the user. Furthermore, in some implementations, the processor 103 provides the image data or other information to other vehicle assistance/automation system 109 (for example, an automated parking assist system, a lane monitoring system, or an adaptive cruise control system).

Figure 2:
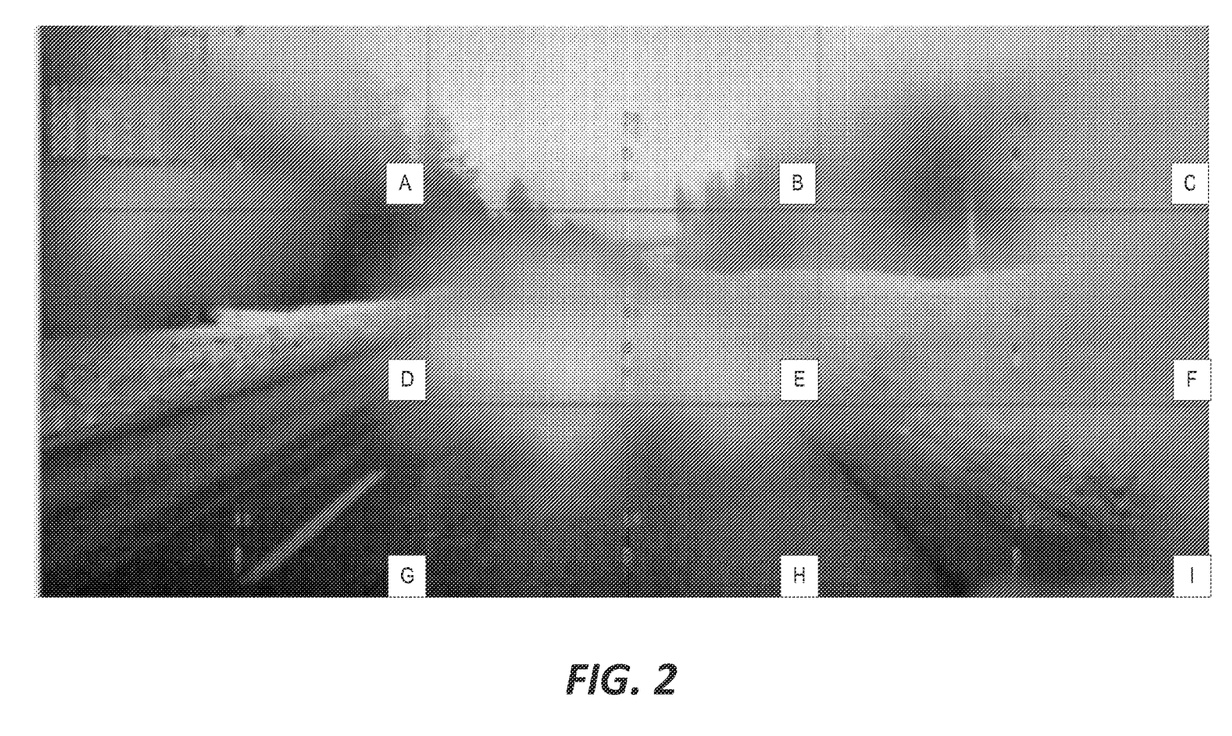
FIG. 2 is an image output from the camera system of FIG. 1.

FIG. 2 illustrates one example of an image captured by the camera 101. As discussed in further detail below, the processor 103 executes the instructions stored on the memory 105 to divide the image area into sub-regions A through I for analysis and processing. In the example of FIG. 2, several of the sub-regions display some degree of image distortion due to camera lens contamination. More specifically, sub-regions B, D, G, H, and I are relatively undistorted. However, sub-regions A, C, E, and F includes a significant amount of image distortion due to lens condensation.

As described in further detail below, the processor 103 applies a detection algorithm to detect contaminants on the camera lens. Within each sub-regions, a set of image quality metrics are determined. In some implementations, the image quality metrics include, for example, image sharpness (e.g., via edge detection or MTF estimation), color variation (e.g., by generating local histograms of each color band), and spatial uniformity (e.g. by analyzing contrast ratio or optical flow). The processor 103 determines the absolute value of the determined metrics and monitors a change in each of the determined metrics over time. By monitoring the change in each of the determined metrics over time (i.e., by monitoring a series of images captured within a certain time frame), the system can flag regions where lens contamination is likely.

For example, in FIG. 2, the lens condensation over much of the lens causes many pixel values in multiple sub-regions to vary slowly both spatially and temporally. Since vehicle motion would normally cause the image metrics (i.e., pixel values) to change at a high frequency and with significant spatial variation in non-contaminated images, the system is able to identify and flag the slow-varying sub-regions as being contaminated. Furthermore, as discussed in further detail below, when the detection algorithm flags an image (or an image sub-regions) as being degraded (i.e., contaminated), the cause of the image degradation can be identified (e.g., condensation vs. dust contamination).

Figure 3A:
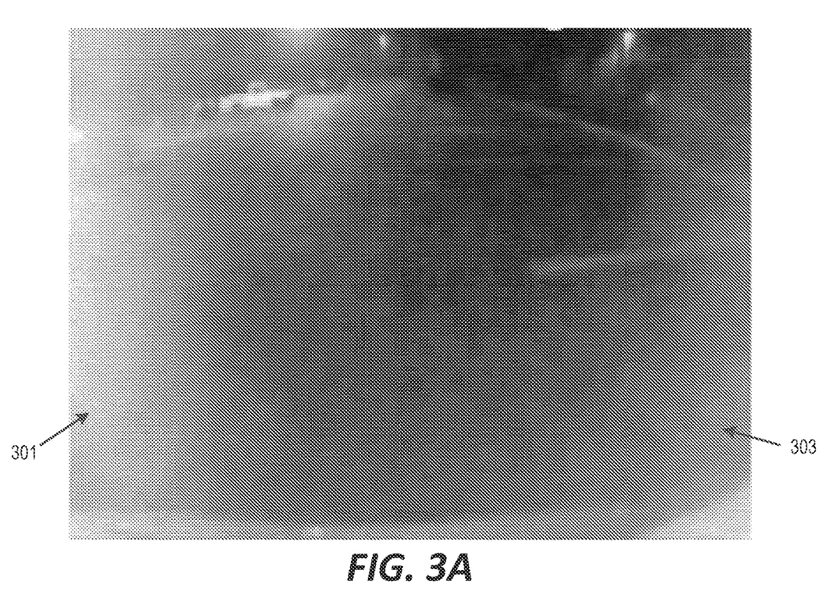
FIG. 3A is an unaltered image output from the camera system of FIG. 1 with lens contamination.

FIG. 3A shows another example of an image that has been degraded by haze or condensation on the lens (i.e., the image blur/light scatter on the left side of the image 301 and on the right side of the image 303). As discussed in further detail below, the detection algorithm processes the image and identifies condensation as the source of the image degradation due to its slow-varying pixel values on the outermost borders of the image.

Different types of lens contamination can affect the amount of true image content that is included in the degraded image. For example, in the condensation degraded image of FIG. 3A, true image data is included in the output image, but is blurred by the condensation on the lens. In contrast, contamination due to dust or another solid foreign object on the camera lens may entirely obstruct and eliminate true image contact such that the affected region does not vary at all over time.

Figure 3B:
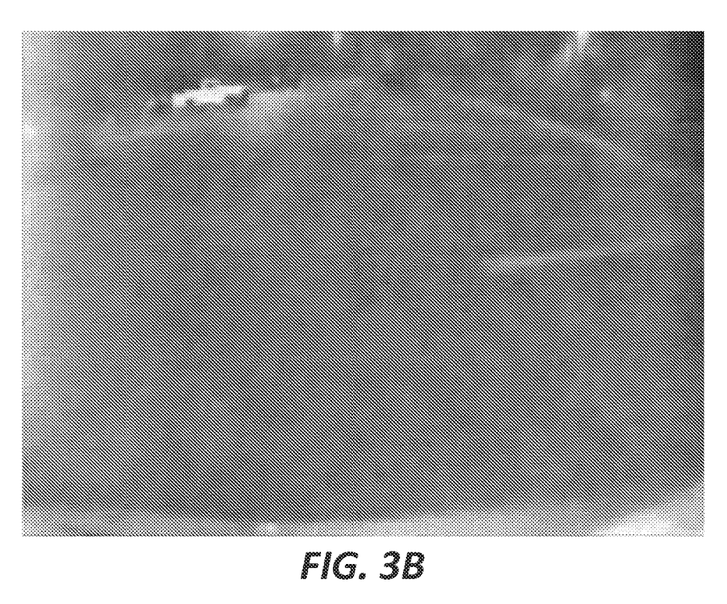

By estimating the type of contamination, the system is able to employ an appropriate compensating algorithm to restore image quality. For example, in FIG. 3A, the slow-varying nature of the scattered light can be leveraged to determine a mask image that varies in the same manner as the scattered light pattern. To compensate for the lens contamination due to condensation and to mitigate the image degradation, the processor 103 subtracts the determined mask image from the original raw image data from the camera 101. As a result, much of the blur in the image of FIG. 3A is removed and the processor 103 generates the enhanced image of FIG. 3B. In the enhanced image of FIG. 3B, the contaminated regions bordering the original camera images have been restored and the road is more uniform in color. Further, more contrast between the road and the parking lines can be observed.

The mask-based method of mitigating image degradation due to lens contamination is just one example of an image enhancement technique that can be applied by the camera system to mitigate a specifically identified type of lens contamination. The systems and methods described herein are not necessarily limited to solutions for condensation or other light-scattering contamination. Accordingly, other approaches and algorithms can be used to restore other types of lens contamination.

Although some of the systems and methods described herein are configured to provide some form of image enhancement to mitigate lens contamination, in some cases, lens contamination can become so severe that the compensating algorithm cannot effectively restore the original camera image for practical use. In such cases, even the enhanced image could not be effectively relied upon by vehicle assistance/automation systems such as a parking assistance system.

In some such cases, the processor 103 can be configured to identify situations where the contamination is so severe that the output image cannot be relied upon. In some implementations, the processor 103 monitors the image metrics (i.e., pixel values) of the restored image as a function of time (i.e., as opposed to monitoring the metrics of the original camera image). In some implementations, the system applies the same contamination detection metric to the enhanced image as was applied to the raw image data to initially detect the lens contamination. If the system determines that the image quality has not improved enough for practical usage, the system concludes that the lens contamination is too severe to effectively restore image quality and concludes that the camera is effectively "blind" in one or more sub-regions of the output image.

As described in further detail below, when the system determines that the camera is effectively "blind," the processor 103 issues a warning to the driver (e.g., visually through the user interface 107 or by other mechanisms including, for example, haptic feedback or an audible tone or message). In some implementations, the warning includes information indicating that (a) the camera is no longer operational due to an excessive and unmitigatable degree of lens contamination, (b) vehicle assistance and automation functions depending on the camera may no longer be available, and (c) the "blind" state of the camera system will persist until the driver cleans or replaces the camera lens. Furthermore, in some implementations, the system is configured to save in the non-transitory memory 105 the date and time that the system determines the camera system to be "blind," notifies the driver, and ceases to display video output on the user interface/display 107.

Figure 4:
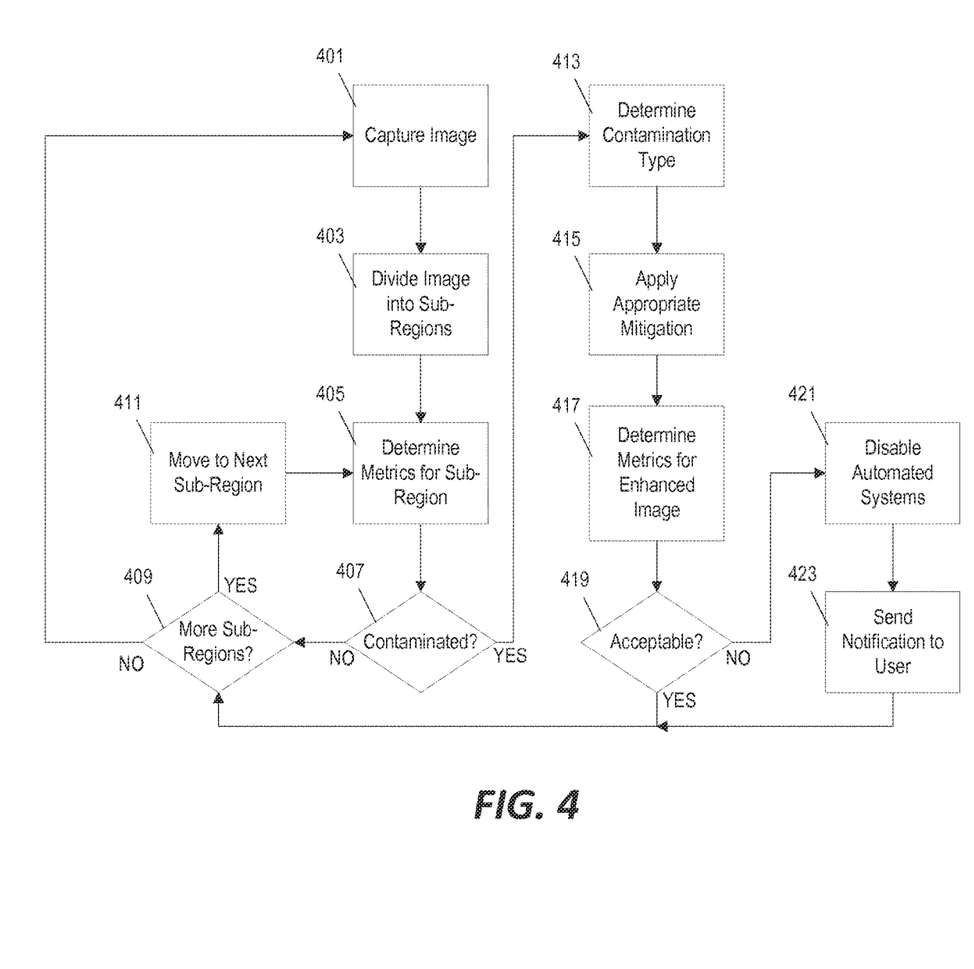
FIG. 4 is a flowchart of a method of detecting and mitigating lens contamination in the system of FIG. 1.

FIG. 4 illustrates a method of monitoring image output data from the camera 101 to detect camera lens contamination and to provide mitigation when lens contamination is detected. The system captures a new image (step 401) and divides the image into sub-regions (step 403) as illustrated in FIG. 2. The system evaluates the image data of the first sub-region and determines one or more metrics for the sub-region (step 405). Based on the image metrics, the system determines whether contamination is detected in the first sub-region (step 407). If no contamination is detected and additional sub-regions of the image remain for evaluation (step 409), the system move on to the next sub-region (step 411) and determines metrics for that sub-region (step 405). This is repeated until each sub-region in the image has been evaluated and then a new image is captured (step 401) and divided for sub-region-specific evaluation.

If contamination is identified in one or more of the sub-regions (step 407), the system determines the type of contamination (step 413) and applies an appropriate mitigation technique to enhance the image to remove the distortion caused by the lens contamination (step 415). The system then determines one or more metrics for the enhanced image sub-region (step 417). If the restoration brings the image to a level of acceptable quality (step 419), then the system replaces the sub-region in the image with the enhanced sub-region image data and move on to the next sub-region for analysis. However, if the mitigation technique is unable to sufficiently improve the image quality and the enhanced image still fails to meeting acceptable levels (step 419), the system disables or limits the functionality provided by vehicle systems that rely upon image data (step 421) and sends a notification to the user (step 423) indicating that the camera system has been rendered at least partially "blind" by camera lens contamination.

Figure 5:
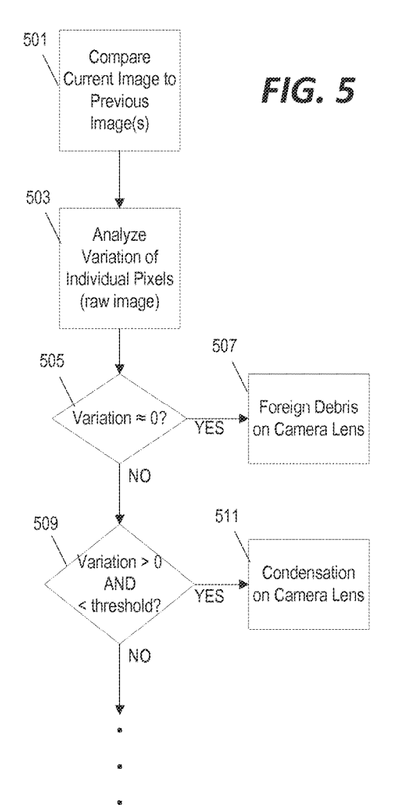
FIG. 5 is a flowchart of a method of identifying specific types of contamination in the system of FIG. 1.

FIG. 5 illustrates an example of a mechanism for determining whether lens contamination is present and, if so, what type of contamination. The system compares the current image to one or more previous images captures by the camera (step 501) and analyzes variations in individual pixel values over time (step 503). As noted above, lens contamination due to a foreign object (e.g., dust or road salt) may completely obstruct the image behind the contamination. As a result, pixels that are affected by such contamination might exhibit no change or variation over time. If the system determines that one or more pixels in a given sub-region exhibit approximately zero variation over time (step 505), the system may conclude that the camera lens is contaminated with foreign debris (step 506).

As also discussed above, if the camera lens is contaminated with water or condensation, the affected pixels will exhibit some variation over time. However, the variation will be slow changing. Therefore, if the system determines that one or more pixels in a given sub-regions exhibit some variation over time, but the degree of variation is below a given threshold (step 509), then the system may conclude that the camera lens is contaminated with condensation (step 511).

Figure 6:
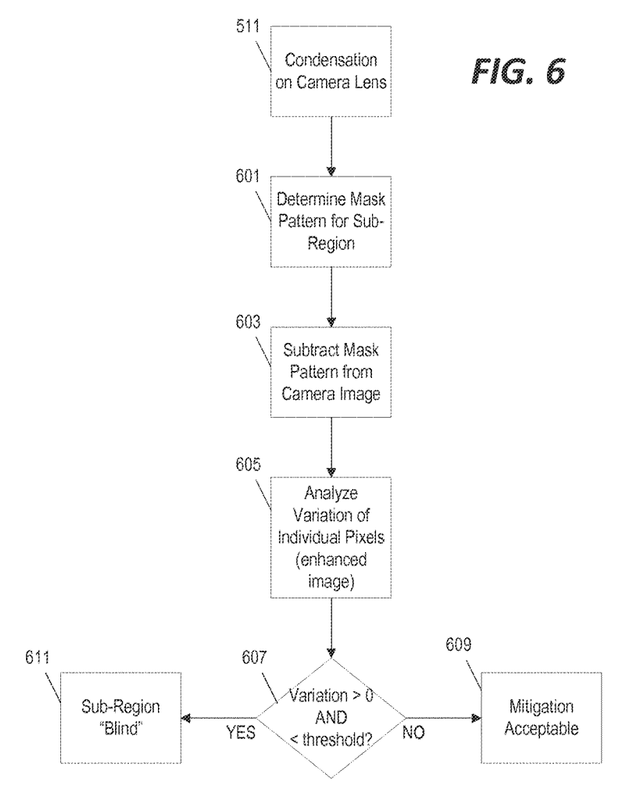
FIG. 6 is a flowchart of a method of mitigating distortion due to lens condensation in the system of FIG. 1.

As discussed above, the system may be configured with various different image processing techniques, each optimized to enhance an image based on a specific type of detected contamination. FIG. 6 illustrates an example of one such method for enhancing an image after condensation contamination is detected. When the system concludes that condensation is present on the camera lens and is negatively impacting the quality of the output image (step 511), the system monitors a series of images over a period of time to develop a mask pattern for the affected sub-region (step 601). The mask pattern is then subtracted from the new camera image to enhance the image quality (step 603).

The system then analyzes the quality of the enhanced image to determine whether the mitigation effectively restored the image quality to an acceptable level. In this example, the system is configured to apply the same metric and evaluation to the enhanced image as was applied to the raw image data. Specifically, the system analyzes variation of individual pixels within the enhanced image over time (step 605). If the enhanced image meets acceptable image quality standards (i.e., the pixel variation is greater than a threshold indicative of a quality image) (step 607), then the system concludes that the mitigation is acceptable (step 609). The enhanced image is displayed to the user and is made available to other vehicle assistance and automation systems. However, if the enhanced image still fails to meet acceptable image quality standards (i.e., the pixel variation is greater than zero, but fails to exceed the threshold indicative of a quality image) (step 607), then the system concludes that the camera system is at least partially blind in the given sub-region (step 611).

Various implementations can be configured to respond differently to partially blind image data depending on the requirements of specific vehicle automation/assistance systems employed on the vehicle and user preference. For example, in some implementations, if one or more sub-regions of the image fail to meet acceptable standards, the image may still be displayed to the user on the user interface/display 107. However, the system may be configured to indicate which sub-regions fail to meet quality standards by high-lighting the border of the particular sub-region(s) in a different color. In other implementations, the system may be configured to omit "blind" sub-regions from the displayed image data and will display image data only in sub-regions that meet the minimum quality standards.

Some vehicle assistance/automation systems require varying degrees of image quality in order to perform effectively. For example, some systems may be configured to monitor adjacent lanes and to provide a warning to the driver when nearby vehicles are detected. These systems may require a lesser degree of image quality as there is less risk associated with an incorrect determination. In contrast, some systems are configured to automatically operate the vehicle to perform parallel parking for a driver. These systems may require a greater degree of image quality as there is substantial risk associated with incorrect operation of such a fully automated vehicle system. As such, the threshold used to determine whether a specific sub-region of an image is "blind" may be varied for individual systems that will utilize the image output. In other words, a given sub-region may be identified as "blind" and unusable for the automated parking system, but the same sub-region may be identified as acceptable for the lane monitoring/warning system. As such, in some situations, one vehicle system may be disabled due to the current amount of lens contamination while another vehicle system is allowed to continue operating.

Similarly, different vehicle systems and functionality may require different fields of view. For example, a vehicle system may only analyze information regarding the road surface immediately behind the vehicle. For such systems, lens contamination that only affects the upper sub-regions of the camera output image would be of no concern. Therefore, some systems may be configured to disable certain specific functionality depending on which specific sub-regions of the camera system are determined to be effectively "blind."

Thus, various embodiments of the invention provide, among other things, a camera system that analyzes image data to detect camera lens contamination, determine a specific type of lens contamination, apply image enhancement routines to mitigate the specific type of detected lens contamination, and to disable certain vehicle functionality if the degree of lens contamination cannot be sufficiently mitigated. Various features and advantages of the invention are set forth in the following claims.

What is claimed is:

1. A method for operating a vehicle camera system, the method comprising:
   receiving an image from a camera mounted on a vehicle;
   calculating one or more metrics based on the received image;
   determining whether a lens of the camera is contaminated based on the one or more calculated metrics;
   determining a type of contamination;
   selecting one of a plurality of mitigation routines to enhance the image based on the determined type of contamination;
   applying the selected mitigation routine to create an enhanced image;
   analyzing the enhanced image to determine whether the contamination is acceptably mitigated after application of the selected mitigation routine; and
   outputting a fault condition signal when the contamination is not acceptably mitigated after application of the selected mitigation routine.

2. The method of claim 1, further comprising dividing the received image into a plurality of sub-regions, and wherein determining whether the lens of the camera is contaminated and determining a type of contamination is performed for each of the plurality of sub-regions.

3. The method of claim 2, wherein outputting a fault condition signal includes outputting a fault condition signal identifying one or more specific sub-regions in which the contamination is not acceptably mitigated after application of the selected mitigation routine.

4. The method of claim 1, further comprising:
   displaying the enhanced image on a display mounted in an interior of the vehicle when the fault condition signal is not output; and
   displaying a notification on the display indicating that the image received from the camera is degraded when the fault condition signal is output.

5. The method of claim 4, further comprising preventing the display from showing the received image and the enhanced image when the fault condition signal is output.

6. The method of claim 1, further comprising providing the received image or the enhanced image to a vehicle assistance system, wherein the vehicle assistance system operates based on a camera image and wherein the vehicle assistance system is at least partially disabled when the fault condition signal is output.

7. The method of claim 6, further comprising displaying a notification on the display indicating that the vehicle assistance system is at least partially disabled when the fault condition signal is output.

8. The method of claim 6, wherein the vehicle assistance system includes at least one selected from a group consisting of an automated parking assist system and a lane detection system.

9. The method of claim 6, wherein some functionality of the vehicle assistance system is limited and other functionality of the vehicle assistance system is made available when the fault condition signal is output depending on a degree of image degradation indicated by one or more metrics calculated based on the enhanced image.

10. The method of claim 6, further comprising dividing the received image into a plurality of sub-regions,
    wherein analyzing the enhanced image to determine whether the contamination is acceptably mitigated after application of the selected mitigation routine includes identifying any individual sub-regions where the contamination is not acceptably mitigated,
    wherein outputting the fault condition signal includes transmitting a message to the vehicle assistance system identifying any individual sub-regions in which the contamination is not acceptably mitigated,
    wherein the vehicle assistance system is configured to operate based on image data from only a sub-set of the plurality of sub-regions, and
    wherein the vehicle assistance system is disabled in response to the output fault condition signal only when the output fault condition signal identifies one or more of the sub-regions from the sub-set of sub-regions as being contaminated and not acceptably mitigated.

11. The method of claim 1,
    wherein calculating one or more metrics based on the received image includes:
       comparing the received image to at least one previously received image from the camera, and
       calculating pixel variation in a plurality of individual pixels from the received images, and
    wherein determining the type of contamination includes:
       determining that the contamination is condensation when the pixel variation for one or more of the plurality of individual pixels is greater than zero and less than a first threshold.

12. The method of claim 11, wherein determining the type of contamination includes determining that the contamination is physical debris on the lens of the camera when the pixel variation of one or more of the plurality of individual pixels is approximately zero.

13. The method of claim 11, wherein, when the contamination type is determined to be condensation, applying the selected mitigation routine includes:
    determining a mask pattern indicative of image distortion based on a plurality of receiving camera images, and
    subtracting the mask patent from the received image from the camera.

14. The method of claim 11, wherein, when the contamination type is determined to be condensation, analyzing the enhanced image includes:
    comparing the enhanced image to at least one previously enhanced image from the camera,
    calculating pixel variation in a plurality of individual pixels from the enhanced images, and
    determining that the contamination is not acceptably mitigated after application of the selected mitigation routine when the calculated pixel variation from the enhanced images is less than a second threshold.

15. The method of claim 14, wherein the first threshold is equal to the second threshold.

16. The method of claim 1, further comprising:
    determining a date and a time when the enhanced image is determined to be not acceptably mitigated; and
    storing the date and the time to a memory.

* * * * *